(12) United States Patent
Kim

(10) Patent No.: US 9,236,596 B2
(45) Date of Patent: Jan. 12, 2016

(54) RECHARGEABLE BATTERY

(75) Inventor: Duk-Jung Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 223 days.

(21) Appl. No.: 13/244,381

(22) Filed: Sep. 24, 2011

(65) Prior Publication Data

US 2013/0004833 A1 Jan. 3, 2013

Related U.S. Application Data

(60) Provisional application No. 61/503,160, filed on Jun. 30, 2011.

(51) Int. Cl.
*H01M 2/04* (2006.01)
*H01M 2/30* (2006.01)
*H01M 2/26* (2006.01)
*H01M 10/058* (2010.01)

(52) U.S. Cl.
CPC ............ *H01M 2/30* (2013.01); *H01M 2/0473* (2013.01); *H01M 2/263* (2013.01); *H01M 10/058* (2013.01)

(58) Field of Classification Search
CPC ... H01M 10/052; H01M 4/131; H01M 4/136; H01M 4/622
USPC ........................................................ 429/181
See application file for complete search history.

(56) References Cited

U.S. PATENT DOCUMENTS

| 6,248,470 | B1 * | 6/2001 | Azema et al. | 429/61 |
| 8,268,478 | B2 | 9/2012 | Kim et al. | |
| 2003/0104276 | A1 | 6/2003 | Mizuno et al. | |
| 2011/0076552 | A1 * | 3/2011 | Taniguchi et al. | 429/181 |

FOREIGN PATENT DOCUMENTS

| CN | 2935481 Y | 8/2007 |
| CN | 101997104 A | 3/2011 |
| EP | 2 330 661 A1 | 6/2011 |
| JP | 2004014173 A * | 1/2004 |
| JP | 2005-302625 A | 10/2005 |
| JP | 2006-324178 A | 11/2006 |
| JP | 2008300319 A * | 12/2008 |
| JP | 2011-023142 A | 2/2011 |
| KR | 10-1997-0015352 A | 4/1997 |

OTHER PUBLICATIONS

English translation of JP02008300319A, Okumara, Dec. 2008, Japan.*

(Continued)

*Primary Examiner* — Jonathan Jelsma
*Assistant Examiner* — Rashid Alam
(74) *Attorney, Agent, or Firm* — Christie, Parker & Hale, LLP

(57) ABSTRACT

A rechargeable battery includes: an electrode assembly in a case; a cap plate coupled to an opening of the case; a rivet electrically connected to the electrode assembly, the rivet including: a first rivet flange; and a second rivet flange; and a gasket between the rivet flange and the cap plate, the gasket including: a first gasket flange configured to be coupled with the first rivet flange; and a second gasket flange configured to be coupled with the second rivet flange.

19 Claims, 8 Drawing Sheets

(56) References Cited

OTHER PUBLICATIONS

Engllish translatino of JP 2004014173 A, Shimozono, Jan. 2004, Japan.*
Full English Translation of JP 2011-023142 A, 23 pages.
EPO Extended Search Report issued on Oct. 1, 2012 for EP 11188533.1 (5 pages).
Machine English Translation of JP 2005-302625 A (11 pages), Oct. 27, 2005.
Machine English Translation of JP 2006-324178 A (10 pages), Nov. 30, 2006.
SIPO Office action dated Aug. 5, 2015, with English translation, for corresponding Chinese Patent application 201110459824.1, (14 pages).
English machine translation of Chinese Publication 2935481 dated Aug. 15, 2007, listed above, (5 pages).

* cited by examiner

RECHARGEABLE BATTERY

CROSS-REFERENCE TO RELATED APPLICATIONS

This application claims the benefit of and priority to U.S. Provisional Application No. 61/503,160, filed on Jun. 30, 2011, in the United States Patent and Trademark Office, the disclosure of which is incorporated herein in its entirety by reference.

BACKGROUND

1. Field

Embodiments of the present invention generally relate to a rechargeable battery, and more particularly, to a rechargeable battery having an improved gasket and terminal structure.

2. Description of the Related Art

A rechargeable battery is a battery that can be recharged, unlike a primary battery that cannot be recharged. A low-capacity rechargeable battery may be used for small portable electronic devices such as a mobile phone, a notebook computer, and a camcorder and a large-capacity battery may be used as a power supply for driving a motor such as a hybrid or electric car or a large-capacity power storage device.

Recently, a high-output rechargeable battery using a non-aqueous electrolyte solution having high energy density has been developed. The high-output rechargeable battery is configured of a large-capacity battery module in which a plurality of rechargeable batteries are connected to each other in series so as to be used to motors for devices requiring large power, for example, an electric car, a hybrid car, or the like.

The rechargeable battery may be configured to have a cylindrical shape, a square shape, or the like.

However, in some circumstances, the electrolyte solution in a case of the rechargeable battery infiltrates between an electrode terminal and a cap plate, thereby causing an electrical short between the electrode terminal and the cap plate.

In addition, the electrolyte solution in the case of the rechargeable battery may leak outside of the case.

The above information disclosed in this Background section is only for enhancement of understanding of the background of the described technology and therefore it may contain information that does not form the prior art that is already known in this country to a person of ordinary skill in the art.

SUMMARY

Aspects of embodiments of the present invention are directed toward a rechargeable battery capable of preventing or reducing the likelihood of an electrical short between an electrode terminal and a cap plate by blocking an electrolyte solution in a case of the rechargeable battery from infiltrating between the electrode terminal and the cap plate.

In addition, aspects of embodiments of the present invention are directed toward a rechargeable battery capable of preventing or protecting an electrolyte solution from being leaked to the outside of a case.

According to an embodiment of the present invention, a rechargeable battery includes: an electrode assembly in a case; a cap plate coupled to an opening of the case; a rivet electrically connected to the electrode assembly, the rivet including: a first rivet flange; and a second rivet flange; and a gasket between the rivet flange and the cap plate, the gasket including: a first gasket flange configured to be coupled with the first rivet flange; and a second gasket flange configured to be coupled with the second rivet flange.

The first gasket flange may be greater than or equal to the first rivet flange in size.

The second gasket flange may be greater than or equal to the second rivet flange in size.

The rivet may further include a pillar part extending through the cap plate.

The gasket may have a through hole and the pillar part of the rivet may extend through the through hole of the gasket.

The first rivet flange may extend in a first direction and a second direction perpendicular to the first direction, the second rivet flange may extend in the second direction, the second rivet flange may extend from a side edge of the first rivet flange, the first gasket flange may extend in the first direction and the second direction, the second gasket flange may extend in the second direction, and the second gasket flange may extend from a side edge of the first gasket, the gasket may include a gasket body extending in a third direction perpendicular to the first and second directions, and the through hole of the gasket may be formed through the gasket body in the third direction.

The rechargeable battery may further include an insulating member having a through hole, and the gasket body may extend through the through hole of the insulating member.

The first rivet flange may extend in a first direction and a second direction perpendicular to the first direction, the second rivet flange may extend in the second direction, the second rivet flange may extend from a side edge of the first rivet flange, the first gasket flange may extend in the first direction and the second direction, the second gasket flange may extend in the second direction, and the second gasket flange may extend from a side edge of the first gasket.

The second gasket flange may include a bent portion extending in a third direction perpendicular to the first and second directions and covering an end of the second rivet flange.

The rivet may further include: a third rivet flange extending in the second direction, the third rivet flange extending from another side edge of the first rivet flange facing oppositely away from the side edge from which the second rivet flange extends.

The gasket may further include: a third gasket flange extending in the second direction, the third gasket flange extending from another side edge of the first gasket flange facing oppositely away from the side edge from which the second gasket flange extends and configured to be coupled with the third rivet flange.

The third gasket flange may be greater than or equal to the third rivet flange in size.

The third gasket flange may include a bent portion extending in a third direction perpendicular to the first and second directions and covering an end of the third rivet flange.

The gasket may further include a rivet flange coupling part including: a first rivet flange coupling lip extending from the first gasket flange in a third direction perpendicular to the first and second directions; and a second rivet flange coupling lip extending from the second gasket flange in the third direction.

The second gasket flange may be thinner than the first gasket flange.

The rechargeable battery may further include an insulating member having a coupling groove configured to house the rivet flange and the gasket, wherein the insulating member may be between the gasket and the cap plate, and the gasket and the first and second rivet flanges are between the cap plate and the insulating member.

The rechargeable battery may further include a current collector, wherein the rivet may be electrically coupled to the electrode assembly via the current collector, the current collector comprising a terminal coupling part and an electrode coupling part.

The insulating member may include a coupling groove configured to house the terminal coupling part between the coupling groove and the rivet flange.

The insulating member may further include a coupling ring at a side edge of the insulating member, the coupling ring encircling a portion of the electrode coupling part.

The cap plate may include a plurality of protruding grooves and the insulating member may include fixing protrusions configured to be respectively coupled with the protruding grooves.

DETAILED DESCRIPTION

Figure 1:
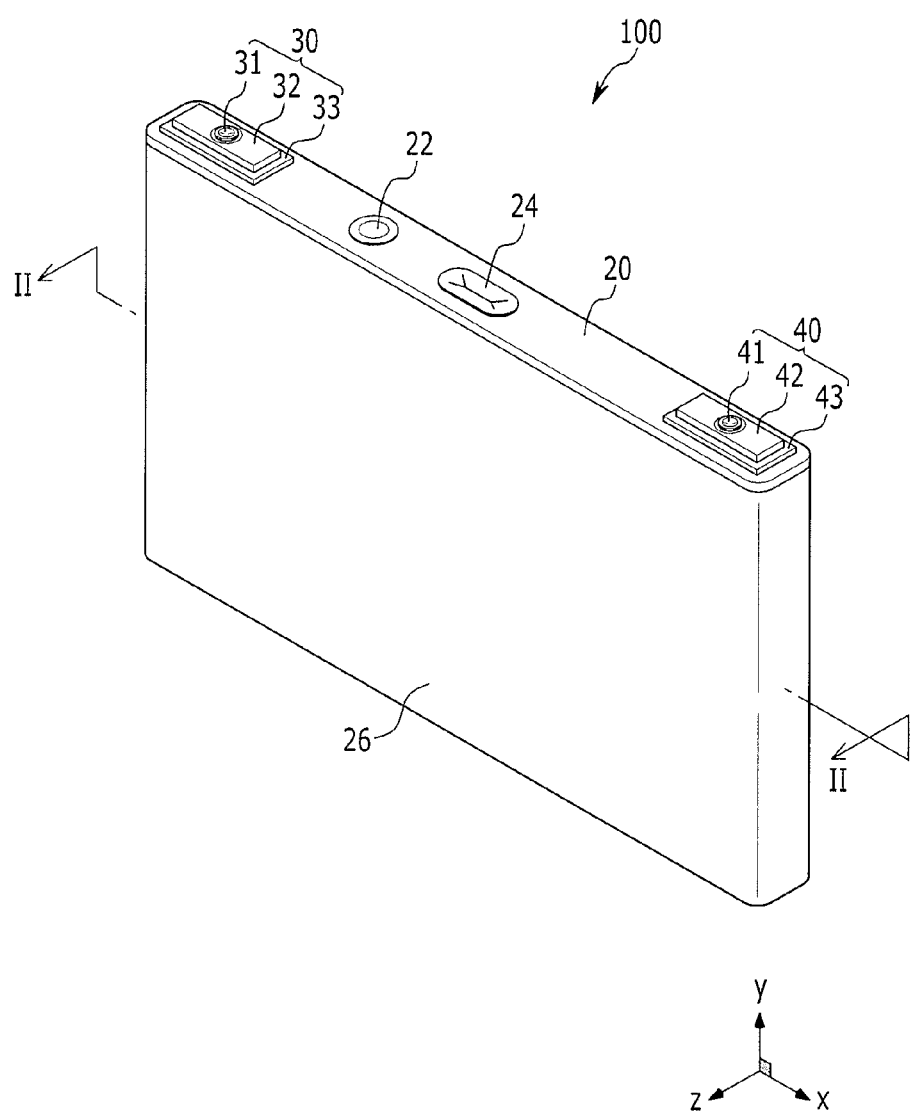
FIG. 1 is a perspective view of a rechargeable battery according to a first exemplary embodiment of the present invention.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, dimensions of layers, regions, etc., are exaggerated for clarity. It will be understood that when one layer or one element is considered to as being "on" another element, it can be directly on the other element or intervening elements may also be present therebetween. Further, it will be understood that when one layer or one element is considered to as being "under" another element, it can be directly on (under) the other element or at least one intervening element may also be present therebetween. In addition, it will be understood that when one layer is considered to as being "between" two layers, it can be a unique layer between two layers or at least one other layer may also be present therebetween. Like reference numerals designate like elements throughout the specification and the drawings.

Figure 2:
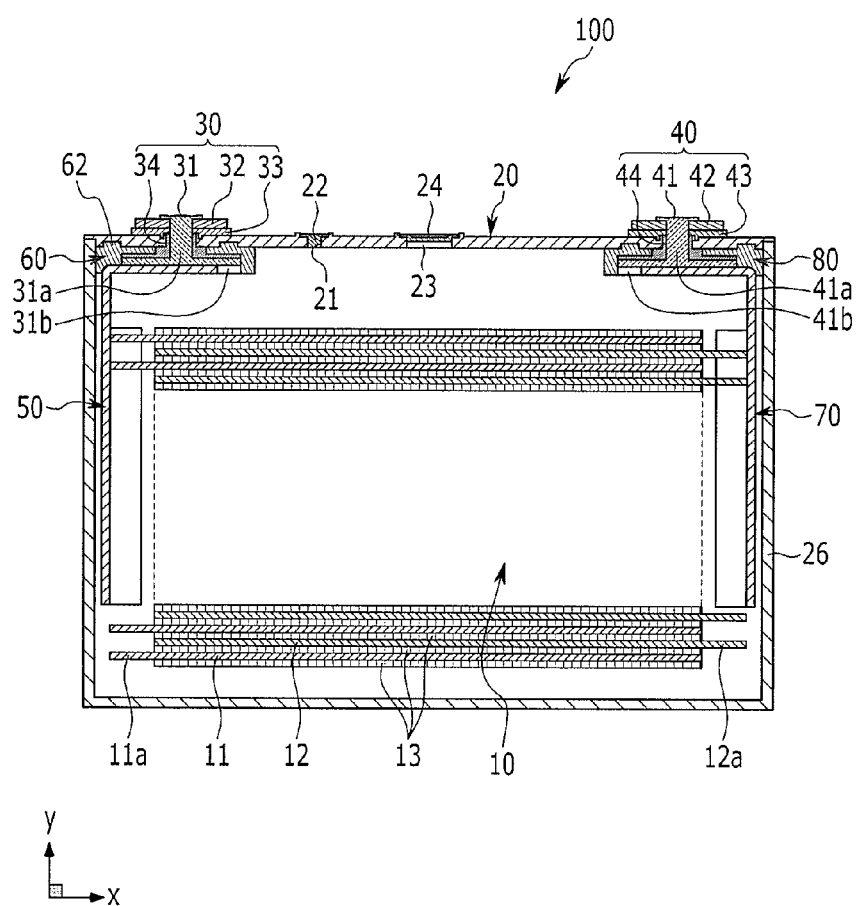
FIG. 2 is a cross-sectional view taken along line II-II in FIG. 1.

FIG. 1 is a perspective view of a rechargeable battery according to a first exemplary embodiment of the present invention and FIG. 2 is a cross-sectional view taken along line II-II of FIG. 1.

Referring to FIGS. 1 and 2, a rechargeable battery 100 according to an exemplary embodiment of the present invention includes a plurality of electrode assemblies 10 formed by winding a first electrode 11 and a second electrode 12 together, having the separator 13 disposed between the first electrode 11 and the second electrode 12, a case 26 in which the electrode assemblies 10 are embedded (or housed), a first terminal part 30 and a second terminal part 40 electrically connected with the electrode assemblies 10, a cap plate 20 coupled with an opening formed in the case 26, and first and second insulating members 60 and 80 installed in the case 26.

The rechargeable battery 100 according to one exemplary embodiment is a lithium ion rechargeable battery. Herein, a squared rechargeable battery will be described by way of example. However, embodiments of the present invention are not limited thereto and the present invention may be applied to a battery such as a lithium polymer battery, or the like.

In addition, the first electrode 11 may be a negative electrode and the second electrode 12 may be a positive electrode, or vice versa. However, for the sake of convenience, in the exemplary embodiment, the first electrode 11 and the second electrode 12 will be described instead of the negative electrode and the positive electrode, respectively, but embodiments of the present invention are not limited thereto.

The electrode assembly 10 is formed by winding the first electrode 11, the second electrode 12, and the separator 13 together to form a jelly roll structure. The first electrode 11 and the second electrode 12 each include a current collector formed of a thin metal foil and an active material coated on a surface of the current collector. In addition, the first electrode 11 and the second electrode 12 may be partitioned into a coated part in which an active material is coated on the current collector and a first electrode non-coated part 11a and a second electrode non-coated part 12a in which the active material is not coated on the current collector. The coated part forms a substantial portion of the first electrode 11 and the second electrode 12 in the electrode assembly 10, and each of the first electrode non-coated part and the second non-coated part 11a and 12a is disposed at a respective side (e.g., opposite ends) of the coated part in the jelly roll structure.

However, embodiments of the present invention are not limited thereto. The above-described electrode assembly 10 may be formed in a stacked structure, having the separator 13 between the first electrode 11 and the second electrode 12 formed of a plurality of sheets.

The first electrode non-coated part 11a of the electrode assembly 10 is electrically connected to the first terminal part 30 via a first electrode current collecting member (or current collector) 50, and the second electrode non-coated part 12a is electrically connected to the second terminal part 40 via a second electrode current collecting member (or current collector) 70. Therefore, the first terminal part 30 may include a first electrode terminal, and the second terminal part 40 may include a second electrode terminal.

The case 26 is formed in an approximately rectangular parallelepiped (or rectangular prism or cuboid) shape, and one surface thereof is provided with an opened opening.

However, embodiments of the present invention are not limited thereto, and the case may be formed in various suitable shapes, such as a cylindrical shape, a pouch shape, or the like.

According to one embodiment of the present invention, the cap plate 26 is formed of a thin plate and is coupled with the opening of the case 26 to seal the opening. Further, the cap plate 20 is provided with an electrolyte solution inlet 21 through which the electrolyte solution may be injected into the sealed case 26, wherein the electrolyte solution inlet 21 is sealed by a sealing closure 22 after the electrolyte solution is injected. In addition, the cap plate 20 is provided with a vent hole 23 mounted with a vent plate 24 which is adapted to fracture when an internal pressure of the sealed case 26 exceeds a pressure (e.g., a set pressure).

The first and second terminal parts 30 and 40 include first and second rivets 31 and 41, first and second terminal plates 32 and 42, a first terminal insulating member 33 disposed between the first and second terminal plates 32 and 42 and the cap plate 20, a conductive connection member 43, and first and second gaskets 34 and 44. In this configuration, the first and second rivets 31 and 41 include first and second pillar parts 31a and 41a and first and second flange parts 31b and 41b.

According to one exemplary embodiment of the present invention, because the cap plate 20 is electrically connected to the second terminal part 40 by the conductive connection member 43, the cap plate 20 may have the polarity of the positive electrode or the negative electrode.

Further, the first and second electrode current collecting members 50 and 70 include first and second electrode coupling parts 51 and 71 (see, e.g., FIG. 3) coupled with the first and second electrodes 11 and 12 and first and second terminal coupling parts 52 and 72 (see, e.g., FIG. 3) coupled with the first and second terminal parts 30 and 40.

In this configuration, according to one exemplary embodiment of the present invention, the structure of the first and second terminal parts 30 and 40, and the structure of the first and second electrode current collecting members 50 and 70 and first and second insulating members 60 and 80 are substantially the same. Therefore, the description of the second terminal part 40, the second electrode current collecting member 70, and the second insulating member 80 will be omitted.

However, the first terminal part 30 according to one exemplary embodiment of the present invention may include a cylindrically-shaped terminal rather than a plate-shaped terminal.

Instead of the conductive connection member 43, an insulating connection member may be disposed between the cap plate 20 and the second rivet 41. Therefore, in some embodiments of the present invention, the cap plate 20 is not be electrically connected to the second terminal part 40.

Figure 3:
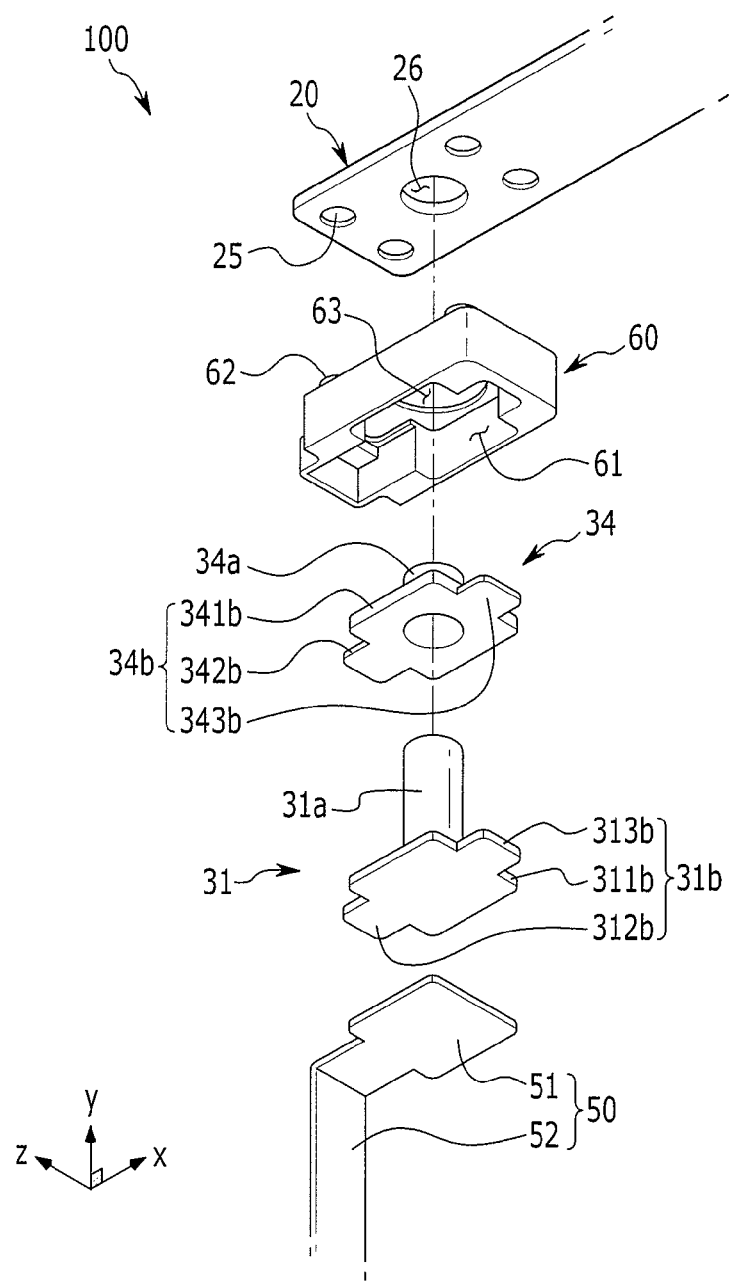
FIG. 3 is a partially exploded perspective view of a rechargeable battery according to the first exemplary embodiment of the present invention.

FIG. 3 is a partially exploded perspective view of a rechargeable battery according to the first exemplary embodiment of the present invention.

Referring to FIG. 3, according to one exemplary embodiment of the present invention, the first rivet 31 includes a pillar part 31a and a rivet flange part 31b.

In more detail, the rivet flange part 31b may include a first rivet flange 311b and a second and third rivet flanges 312b and 313b. In this configuration, the first rivet flange 311b may protrude in a direction (x-axis direction) approximately perpendicular to a height direction (y-axis direction) of the pillar part 31a at one end of the pillar part 31a. Further, the second rivet flange 312b protrudes in a direction (x-axis direction) approximately perpendicular to a height direction (y-axis direction) of the pillar part 31a at one end of the first rivet flange 311b and a third rivet flange 313b may protrude from the other end thereof positioned at an opposite side of the one end thereof.

In addition, the first gasket 34 according to the exemplary embodiment may include a body 34a in which a through hole is formed and a gasket flange part 34b.

In more detail, the gasket flange part 34b may include a first gasket flange 341b and second and third gasket flanges 342b and 343b. In this configuration, the first gasket flange 341b may protrude in a direction (x-axis direction) approximately perpendicular to a height direction (y-axis direction) of the body 34a at one end of the body 34a. Further, the second gasket flange 342b protrudes in a direction (x-axis direction) approximately perpendicular to a height direction (y-axis direction) of the body 34a at one end of the first gasket flange 341b and the third gasket flange 343b protrudes from the other end of the first gasket flange 341b (e.g., positioned at an opposite side of the one end of the first gasket flange 341b)

In addition, a first insulating member 60 according to one embodiment of the present invention includes a coupling groove 61, a plurality of fixing protrusions 62 fixed to a plurality of protruding grooves 25 formed on the cap plate 20, and a through hole 63 through which the first rivet 31 penetrates. In this configuration, the coupling groove 61 may be formed on one surface of the first insulating member 60 opposite to (e.g., facing away from) the electrode assembly 10, as shown in FIG. 2.

Moreover, the first electrode current collecting member 50 may include a first electrode coupling part 51 and a first terminal coupling part 52 that are coupled with the first electrode 11.

Hereinafter, the coupling relationship between the first rivet 31 and the first gasket 34 according to the exemplary embodiment will be described in more detail.

In the first insulating member 60, the fixing protrusions 62 may be fixed to the protrusion grooves 25 formed on the cap plate 20.

Further, the first gasket 34 may be inserted into the coupling groove 61 formed on the bottom of the first insulating member 60. In this configuration, the body 34a of the gasket 34 is inserted into the through hole 63 and the coupling groove 61 may receive the first gasket flange 341b and the second gasket flange 342b formed in the first gasket 34.

In this case, the second gasket flange part 342b of the first gasket 34 may be disposed in parallel with the length direction (x-axis direction) of the cap plate 20.

In addition, the pillar part 31a of the first rivet 31 may be disposed to penetrate through the body 34a of the first gasket 34, the through hole 63 of the first insulating member 60, and the terminal hole 26 formed on the cap plate 20, and the first rivet flange 311b, the second rivet flange 312b, and the third rivet flange 313b may be received in the coupling groove 61. In this case, the second rivet flange 312b and the third rivet flange 313b are closely disposed to the second gasket flange 342b and the third gasket flange 343b, respectively, so as to be disposed at the coupling groove 61.

Therefore, the first rivet flange 311b of the first rivet 31, the first gasket flange 341b of the first gasket 34, the second and third rivet flanges 312b and 313b of the first rivet, and the second and third gasket flanges 342b and 343b of the first gasket 34 may be closely disposed to each other at the coupling groove 61.

In this configuration, the size of the first gasket flange 341b may be greater than or equal to the size of the first rivet flange 311b, the size of the second gasket flange 342b may be greater than or equal to the size of the second rivet flange 312b, and the size of the third gasket flange 343b may be greater than or equal to the size of the third rivet flange 313b.

Consequently, the size of the gasket flange part 34b of the first gasket 34 may be greater than or equal to the size of the rivet flange part 31b of the first rivet 31.

Referring again to FIG. 2, the end of the pillar part 31a of the first rivet 31 may be coupled with the first terminal plate 32 by the rivet, and the first terminal coupling part 52 of the first electrode current collecting member 50 may be inserted into the coupling groove 61 to be coupled with the first rivet 31 by a weld, or the like.

Therefore, in one embodiment of the present invention, the first insulating member 60 is disposed between the electrode current collector 10 and the cap plate 20 by fixing the rivet flange part 31*b* of the first rivet 31 to the coupling groove 61.

The electrolyte solution injected into the case of the rechargeable battery 100 according to one exemplary embodiment may permeate into the coupling groove 61 of the first insulating member 60 or between the first insulating member 60 and the cap plate 20, such that an electrical short is formed between the cap plate 20 and the first rivet 31. In this case, since the size of the gasket flange part 34*b* according to the exemplary embodiment may be greater than or equal to the size of the rivet flange part 31*b*, the adhesion between the gasket flange part 34*b* and the rivet flange part 31*b* may be more improved compared to a comparative example in which the size of the gasket flange part 34*b* is smaller than the size of the rivet flange part 31*b*.

Therefore, it is possible to prevent or reduce the risk of the electrolyte solution in the case 26 from leaking outside of the case 26.

In addition, because the second gasket flange 342*b* extending from one end of the first gasket flange 341*b* is disposed close to the second rivet flange 312*b* and because the third gasket flange 342*b* extending from an opposite end of the first gasket flange 341*b* is disposed close to the third rivet flange 313*b*, the electrolyte solution permeating into the first insulating member 60 passes between the second gasket flange 342*b* and the first insulating member 60 so as to reach the cap plate 20.

Therefore, the adhesion between the rivet flange part 31*b* and the first gasket 34 is improved by the gasket flange part 34*b* of the first gasket 34 according to the exemplary embodiment, and the length of the entire path through which the electrolyte needs to permeate into the first insulating member 60 to reach the cap plate 20 is increased, such that the risk of an electrical short between the cap plate 20 and the first rivet 31 due to the electrolyte solution can be reduced.

Figure 4:
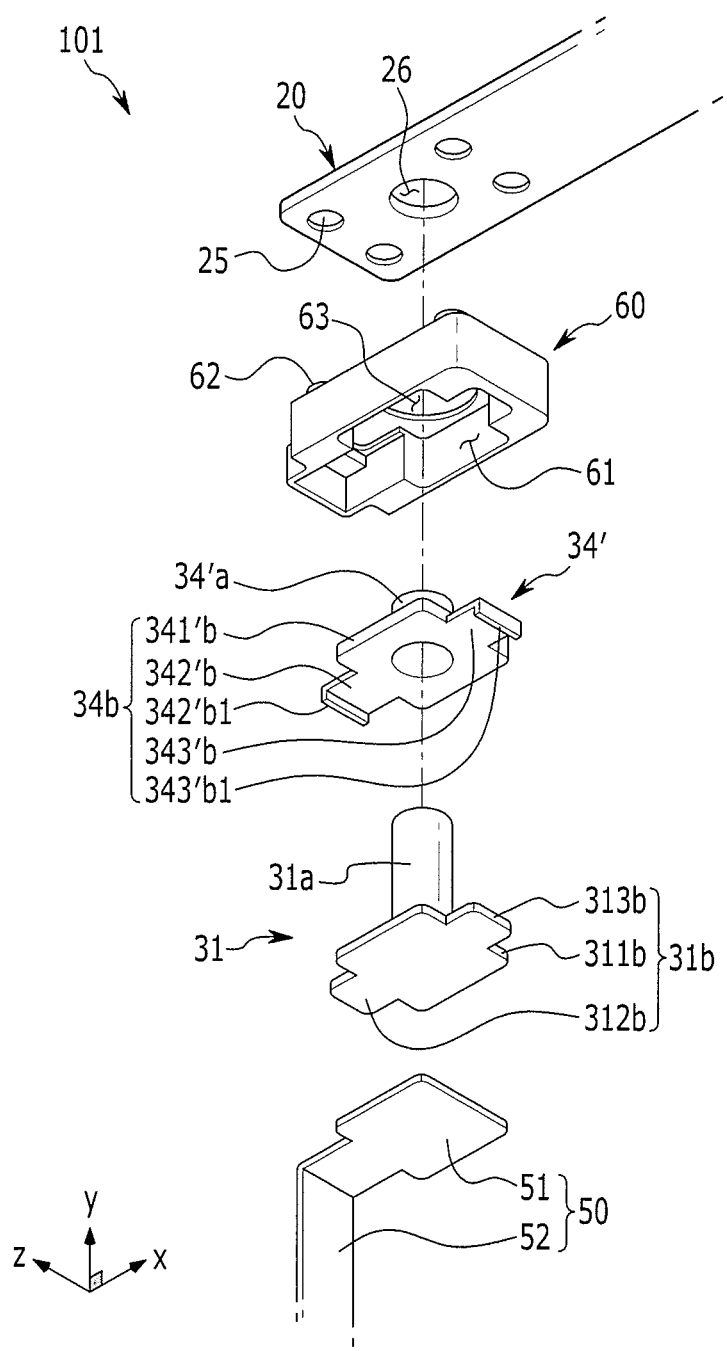
FIG. 4 is a partially exploded perspective view of a rechargeable battery according to a modified example of the first exemplary embodiment of the present invention.

FIG. 4 is a partially exploded perspective view of a rechargeable battery according to another embodiment of the present invention.

In this case, the rechargeable battery 101 according to the exemplary embodiment of FIG. 4 has the same structure as the rechargeable battery 100 according to the first exemplary embodiment, except for the first gasket 34', and therefore, a description of the same structure will be omitted.

Referring to FIG. 4, the first gasket 34' according to the exemplary embodiment may include a body 34'*a* in which a through hole is formed and a gasket flange part 34'*b*.

In more detail, the gasket flange part 34'*b* may include a first gasket flange 341'*b*, a second gasket flange 342'*b*, and a third gasket flange 343'*b*.

In this configuration, the first gasket flange 341'*b* may protrude in a direction (x-axis direction) approximately perpendicular to a height direction (y-axis direction) of the body 34'*a* at one end of the body 34'*a*.

Further, the second gasket flange 342'*b* may protrude in a direction (x-axis direction) approximately perpendicular to a height direction (y-axis direction) of the body 34'*a* at one end of the first gasket flange 341'*b* and the third gasket flange 343'*b* may protrude from the other end of the first gasket flange 341'*b* and may be positioned at an opposite side of the one end thereof.

In this configuration, the end of the second gasket flange 342'*b* may be bent downwardly to form a bent portion 342'*b*1 of the second gasket flange 342'*b*. Similarly, the end of the third gasket flange 343'*b* may be bent downwardly to form a bent portion 343'*b*1.

Therefore, the second and third gasket flanges 342'*b* and 343'*b* may also be closely disposed at the side of the second rivet flange 312*b* and the third rivet flange 313*b*, respectively.

As a result, it is possible to further improve the adhesion between the rivet flange 31*b* and the first gasket 34' by bent portions 342'*b*1 and 343'*b*1 of the second and third gasket flanges 342'*b* and 343'*b* according to the exemplary embodiment. Therefore, it is possible to prevent or protect the electrolyte solution in the case 26 from being leaked to the outside of the case 26.

In addition, according to one exemplary embodiment, because the entire path through which the electrolyte solution permeates into the first insulating member 60 to reach the cap plate 20 is increased, the risk of an electrical short between the cap plate 20 and the first rivet 31 due to the electrolyte solution can be reduced.

Figure 5:
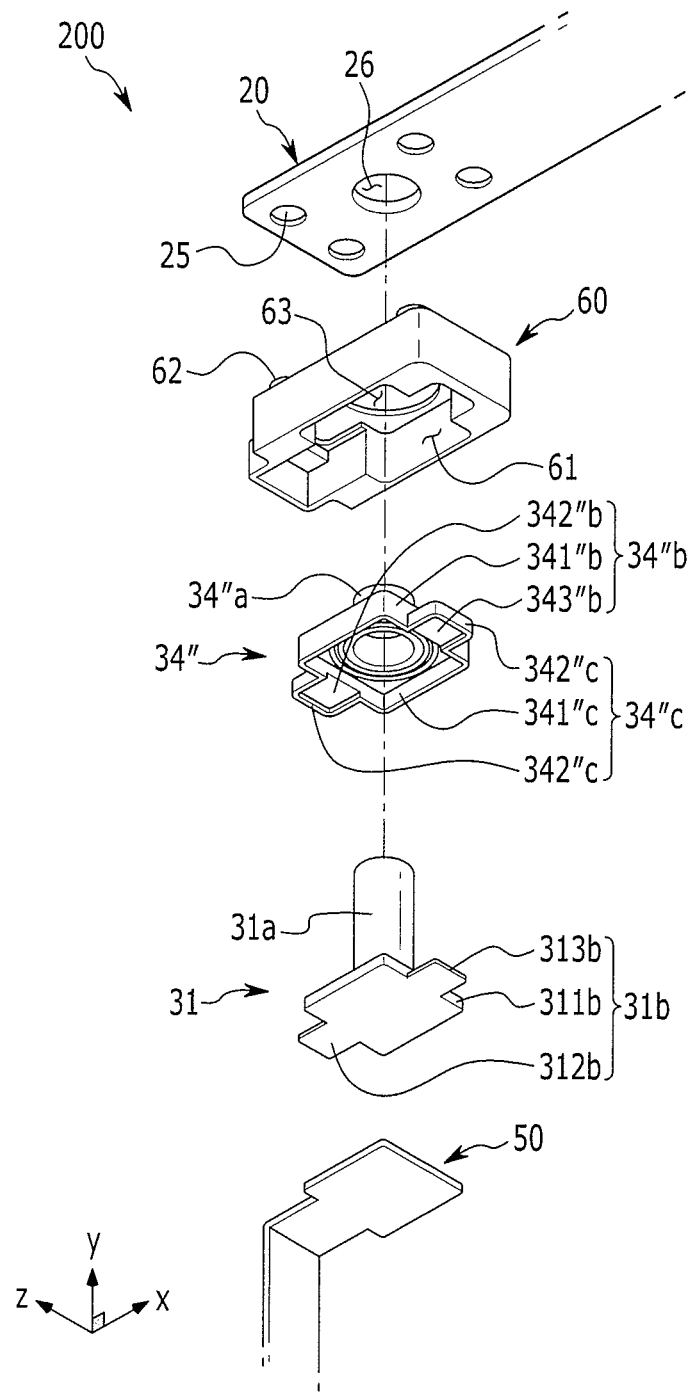
FIG. 5 is a partially exploded perspective view of a rechargeable battery according to a second exemplary embodiment of the present invention.

FIG. 5 is a partially exploded perspective view of a rechargeable battery according to a second exemplary embodiment of the present invention.

The rechargeable battery 200 according to the second exemplary embodiment has substantially the same structure as the rechargeable battery 100 according to the first exemplary embodiment, except for the first gasket 34'', and therefore, the description of structures that are substantially the same will be omitted.

Referring to FIG. 5, a first gasket 34'' according to the exemplary embodiment includes a body 34''*a* in which a through hole is formed, a gasket flange part 34''*b*, and a rivet flange coupling lip 34''*c*.

According to the exemplary embodiment, the gasket flange part 34''*b* includes a first gasket flange 341''*b*, a second gasket flange 342''*b*, and a third gasket flange 343''*b*.

However, the first gasket flange part 341''*b*, the second gasket flange part 342''*b*, and the third gasket flange part 343''*b* according to the exemplary embodiment have substantially the same structure as the first gasket flange 341*b* and the second gasket flange 342*b* of the first gasket 34 according to the first exemplary embodiment and therefore, the descriptions of the substantially similar structures will be omitted.

Further, a rivet flange coupling lip 34''*c* according to the exemplary embodiment is disposed on the bottom (e.g., in a direction facing toward the first and second rivet flanges 31*b* of rivet 31) of the gasket flange part 34''*b*.

In more detail, the rivet flange coupling lip 34''*c* includes a first rivet flange coupling lip 341''*c* formed on the bottom of the first gasket flange 341''*b*, a second rivet flange coupling lip 342''*c* formed on the bottom of the second gasket flange 342''*b*, and a third rivet flange coupling lip 343''*c* formed on the bottom of the third gasket flange 343''*b*.

Therefore, the first rivet flange 311*b* is coupled with the first rivet flange coupling lip 341''*c*, the second rivet flange 312*b* is coupled with the second rivet flange coupling lip 342''*c*, and the third rivet flange 313*b* is coupled with the third rivet flange coupling lip 343''*c*.

Therefore, according to the exemplary embodiment, the rivet flange 31*b* is inserted into the rivet flange coupling lip 34''*c*, such that the sides of the rivet flange 31*b* are also closely disposed to the gasket flange part 34''*b*.

Therefore, the adhesion between the gasket flange part 34''*b* and the rivet flange 31*b* may be more improved.

As a result, it is possible to prevent or reduce the risk of the electrolyte solution in the case 26 from being leaked outside of the case 26.

In addition, because the entire path through which the electrolyte solution must permeate into the first insulating member 60 to reach the cap plate 20 is increased, the risk of an electrical short between the cap plate 20 and the first rivet 31 due to the electrolyte solution may be reduced.

Figure 6:
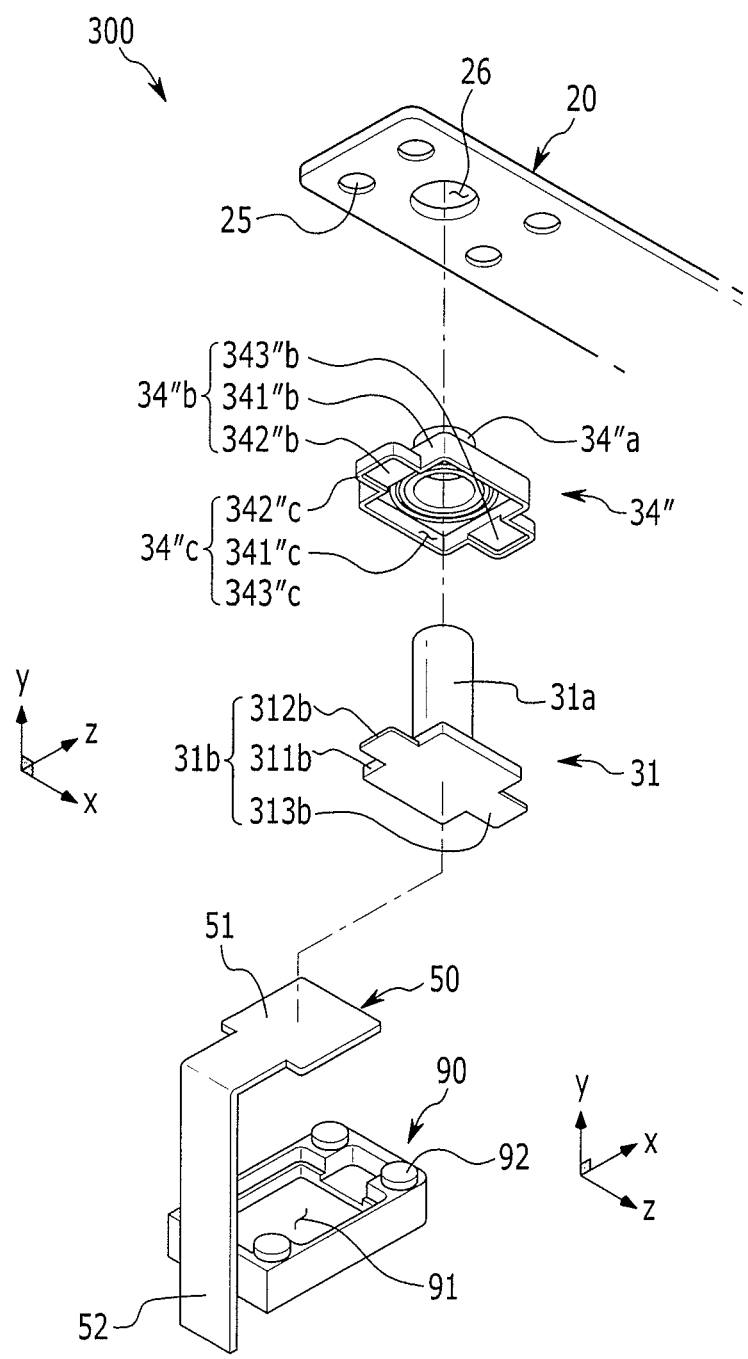
FIG. 6 is a partially exploded perspective view of a rechargeable battery according to a third exemplary embodiment of the present invention.
Figure 7:
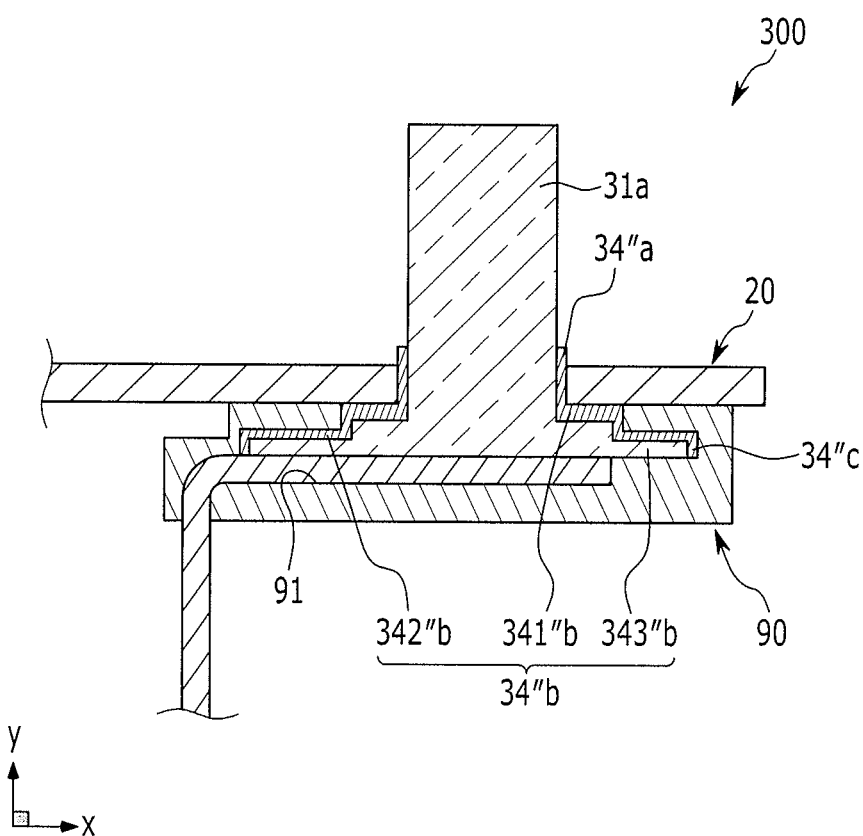
FIG. 7 is a partial cross-sectional view according to a coupling state of the rechargeable battery of FIG. 6.

FIG. 6 is a partially exploded perspective view of a rechargeable battery according to a third exemplary embodiment and FIG. 7 is a partial cross-sectional view according to a coupling state of the rechargeable battery of FIG. 6.

In this embodiment, a rechargeable battery 300 according to the exemplary embodiment has substantially the same structure as the rechargeable battery 200 according to the second exemplary embodiment, except for a first insulating member 90, and therefore, the description of the substantially similar structures will be omitted.

Referring to FIGS. 6 and 7, the first insulating member 90 according to the third exemplary embodiment includes a coupling groove 91 with which the first electrode current collecting member (or current collector) 50 is coupled and a plurality of fixing protrusions 92 fixed to the plurality of protruding grooves 25 formed on the cap plate 20.

In this configuration, the coupling groove 91 according to the third exemplary embodiment is formed on a surface of the first insulating member 90 that is opposite to (e.g., facing) the cap plate 20.

Therefore, as shown in FIG. 7, the first electrode coupling part 51 of the first electrode current collecting member 50 is received in the coupling groove 91 formed on the first insulating member 90.

In addition, the first rivet 31 and the first gasket 34" are sequentially stacked in the coupling groove 91.

Therefore, it is possible to more easily couple the first electrode current collecting member 50, the first rivet 31, and the first gasket 34".

Moreover, because the first electrode coupling part 51 of the first electrode current collecting member 50 is received in the coupling groove 91, the first insulating member 90 according to the third exemplary embodiment may prevent or mitigate the contact between the first electrode coupling part 51 and the electrolyte solution. Therefore, it is possible to prevent or reduce the risk of an electrical short between the cap plate 20 and the first rivet 31.

Figure 8:
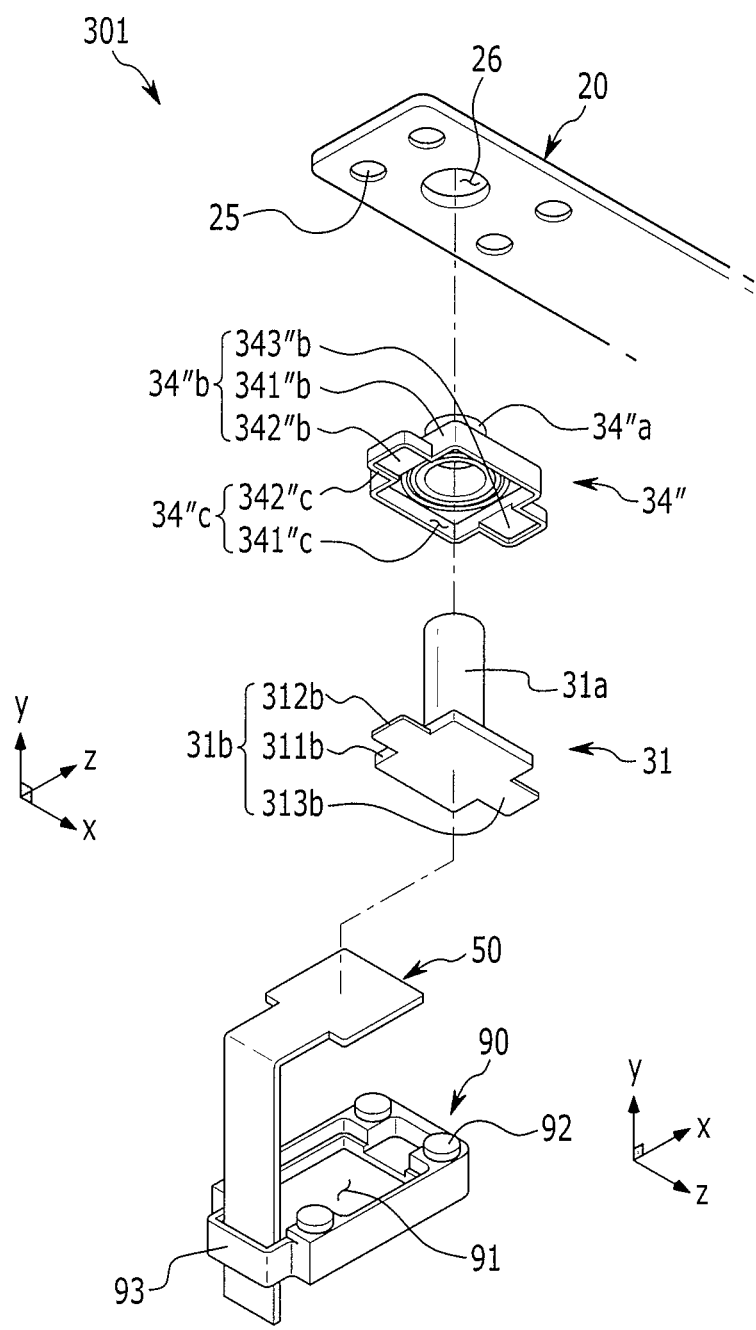
FIG. 8 is a partially exploded perspective view of a rechargeable battery according to a modified example of the third exemplary embodiment of the present invention.

FIG. 8 is a partially exploded perspective view of a rechargeable battery according to a modified example of a third exemplary embodiment.

In this case, a rechargeable battery 301 according to the modified third exemplary embodiment has substantially the same structure as the rechargeable battery 300 according to the third exemplary embodiment, except for a first electrode current collecting member coupling ring 93 of the first insulating member 90 and therefore, the description of substantially similar structures will be omitted.

Referring to FIG. 8, the first insulating member 90 according to the exemplary embodiment includes a first electrode current collecting member coupling ring 93 that extends from one side of the first insulating member 90.

Therefore, one side of the first terminal coupling part 52 of the first electrode current collecting member 50 is fixed by the first electrode current collecting member coupling ring 93.

As a result, the first electrode current collecting member 50 may be more stably coupled with the first insulating member 90 by the first electrode current collecting member coupling ring 93.

As shown in FIGS. 3, 4, 5, 6, and 8, the first, second, and third rivet flanges and first, second, and third gasket flanges have substantially rectangular shapes. However, embodiments of the present invention are not limited thereto. For example, in other embodiments of the present invention, the first, second, and third rivet flanges may be circular, oval, or triangular in shape and the first, second, and third gasket flanges may have corresponding shapes.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of Some Symbols | |
|---|---|
| 100, 101, 200, 300, 301: Rechargeable battery | |
| 10: Electrode assembly | |
| 11: First electrode | 12: Second electrode |
| 13: Separator | 30: First terminal part |
| 31: First rivet | 31a: Pillar part |
| 31b: Rivet flange part | 311b: First rivet flange |
| 312b: Second rivet flange | 34a: Body |
| 313b: Third rivet flange | |
| 34, 34', 34": First gasket | |
| 34b, 34'b, 34"b: Gasket flange part | |
| 341b, 341'b, 341"b: First gasket flange | |
| 342b, 342'b, 342"b: Second gasket flange | |
| 343b, 343'b, 343"b: Third gasket flange | |
| 60, 90: First insulating member | |
| 80: Second insulating member | |
| 93: First electrode current collecting member coupling ring | |

What is claimed is:

1. A rechargeable battery comprising:
   an electrode assembly in a case;
   a cap plate coupled to an opening of the case;
   a rivet electrically connected to the electrode assembly, the rivet comprising:
      a rectangular base;
      a first rivet flange; and
      a second rivet flange; and
   a gasket between the rivet and the cap plate, the gasket comprising:
      a first gasket flange configured to be coupled with the first rivet flange; and
      a second gasket flange configured to be coupled with the second rivet flange;
   wherein the first rivet flange and the second rivet flange define an open corner,
   wherein the first rivet flange extends from a first edge of the rectangular base in a first direction and the second rivet flange extends from a second edge of the rectangular base in a second direction crossing the first direction, and
   wherein the rivet further comprises:
      a third rivet flange extending from a third edge of the rectangular base in a direction opposite to the second direction.

2. The rechargeable battery of claim 1, wherein the first gasket flange is greater than or equal to the first rivet flange in size.

3. The rechargeable battery of claim 1, wherein the second gasket flange is greater than or equal to the second rivet flange in size.

4. The rechargeable battery of claim 1, wherein the rivet further comprises a pillar part extending from the rectangular base through the cap plate.

5. The rechargeable battery of claim 4, wherein the gasket has a through hole and wherein the pillar part of the rivet extends through the through hole of the gasket.

6. The rechargeable battery of claim 5,
wherein the gasket further comprises a rectangular gasket base,
wherein the first gasket flange extends from a first edge of the rectangular gasket base in the first direction and the second gasket flange extends from a second edge of the rectangular gasket base in the second direction, and the gasket comprises a gasket body extending from the rectangular gasket base in a third direction perpendicular to the first and second directions and the through hole of the gasket is formed through the gasket body in the third direction.

7. The rechargeable battery of claim 6, further comprising an insulating member having a through hole,
wherein the gasket body extends through the through hole of the insulating member.

8. The rechargeable battery of claim 1,
wherein the gasket further comprises a rectangular gasket base,
wherein the first gasket flange extends from a first edge of the rectangular gasket base in the first direction and the second gasket flange extends from a second edge of the rectangular gasket base in the second direction.

9. The rechargeable battery of claim 8, wherein the second gasket flange comprises a bent portion extending in a third direction perpendicular to the first and second directions and covering an end of the second rivet flange.

10. The rechargeable battery of claim 8, wherein the gasket further comprises:
a third gasket flange extending from a third edge of the rectangular gasket base in a direction opposite to the second direction and configured to be coupled with the third rivet flange.

11. The rechargeable battery of claim 10, wherein the third gasket flange is greater than or equal to the third rivet flange in size.

12. The rechargeable battery of claim 10, wherein the third gasket flange comprises a bent portion extending in a third direction perpendicular to the first and second directions and covering an end of the third rivet flange.

13. The rechargeable battery of claim 10, wherein the gasket further comprises a rivet flange coupling part comprising:
a first rivet flange coupling lip extending from the first gasket flange in a third direction perpendicular to the first and second directions; and
a second rivet flange coupling lip extending from the second gasket flange in the third direction.

14. The rechargeable battery of claim 1, wherein the second gasket flange is thinner than the first gasket flange.

15. The rechargeable battery of claim 1, further comprising an insulating member having a coupling groove configured to house the rivet and the gasket, wherein the insulating member is between the gasket and the cap plate, and the gasket and the first and second rivet flanges are between the cap plate and the insulating member.

16. The rechargeable battery of claim 15, further comprising a current collector, wherein the rivet is electrically coupled to the electrode assembly via the current collector, the current collector comprising a terminal coupling part and an electrode coupling part.

17. The rechargeable battery of claim 16, wherein the insulating member comprises a coupling groove configured to house the terminal coupling part between the coupling groove and the rivet.

18. The rechargeable battery of claim 16, wherein the insulating member further comprises a coupling ring at a side edge of the insulating member, the coupling ring encircling a portion of the electrode coupling part.

19. The rechargeable battery of claim 1, wherein the cap plate comprises a plurality of protruding grooves and
wherein an insulating member comprises fixing protrusions configured to be respectively coupled with the protruding grooves.

* * * * *